United States Patent
Mei et al.

(10) Patent No.: US 12,398,039 B2
(45) Date of Patent: Aug. 26, 2025

(54) TOTAL HEAT ENERGY RECOVERY SYSTEM FOR FURNACE-PROCESS PHOSPHORIC ACID

(71) Applicant: Kunming University of Science and Technology, Kunming (CN)

(72) Inventors: Yi Mei, Kunming (CN); Yuanzhi Zhu, Kunming (CN); Yunxiang Nie, Kunming (CN); Ping Long, Kunming (CN); Delong Xie, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 714 days.

(21) Appl. No.: 17/738,710

(22) Filed: May 6, 2022

(65) Prior Publication Data

US 2022/0281747 A1 Sep. 8, 2022

(30) Foreign Application Priority Data

Mar. 8, 2021 (CN) .......................... 202110251250.2

(51) Int. Cl.
  *C01B 25/12* (2006.01)
  *C01B 25/20* (2006.01)
  *F27D 17/10* (2025.01)
  *F27D 17/13* (2025.01)

(52) U.S. Cl.
  CPC .............. *C01B 25/12* (2013.01); *C01B 25/20* (2013.01); *F27D 17/10* (2025.01); *F27D 17/13* (2025.01)

(58) Field of Classification Search
  CPC ......... C01B 25/12; C01B 25/20; F27D 17/10; F27D 17/13; F22B 1/00; F22D 1/00; F22D 1/50
  See application file for complete search history.

(56) References Cited

FOREIGN PATENT DOCUMENTS

CN 103438414 A * 12/2013

* cited by examiner

*Primary Examiner* — Anthony J Zimmer
*Assistant Examiner* — Syed T Iqbal
(74) *Attorney, Agent, or Firm* — Fish IP Law, LLP

(57) ABSTRACT

A total heat energy recovery system for furnace-process phosphoric acid is disclosed by the present disclosure. The system comprises a phosphorus burning tower, a hydration tower, an absorption tower, a Venturi tube, a demister, an induced draft fan, a deaerator, an economizer, a dilute acid circulating tank, a phosphoric acid pump, and a feedwater pump. In consideration of the whole process system, fresh soft water is deoxidized after being heated by an upper head of the phosphorus burning tower and a gas guide tube, and the deoxidized water is then pumped into the economizer by a high-pressure pump to recover the heat of the hydration tower and then enters a steam pocket of the phosphorus burning tower to generate medium-high pressure steam. Therefore, unified recovery of the heat of a furnace-process phosphoric acid device is achieved, the medium-high pressure steam is generated, the effective energy is improved.

7 Claims, 3 Drawing Sheets

TOTAL HEAT ENERGY RECOVERY SYSTEM FOR FURNACE-PROCESS PHOSPHORIC ACID

CROSS REFERENCE TO RELATED APPLICATION

This patent application claims the benefit and priority of Chinese Patent Application No. 202110251250.2, filed on Mar. 8, 2021, the disclosure of which is incorporated by reference herein in its entirety as part of the present application.

TECHNICAL FIELD

The present disclosure relates to the technical field of phosphorus chemical industry, and in particular relates to a total heat energy recovery system for furnace-process phosphoric acid with effects of energy conservation and emission reduction.

BACKGROUND ART

Phosphoric acid is the basic raw material for the preparation of fine phosphates and other phosphorus chemicals, which is used in petroleum, metallurgy, chemicals, electronics, pharmaceuticals, and other industries. Furnace-process phosphoric acid is high in purity and is widely used in foods, electronic chemicals, and pharmaceuticals. The main existing patents about the two-step furnace-process phosphoric acid production process with heat energy recovery are as follows: in "a device for recovering and utilizing heat energy produced by combustion of yellow phosphorus and a furnace-process phosphoric acid production system of the device (Application No. 01143443.0)", a technical method of recovering the reaction heat of yellow phosphorus using natural air is disclosed at the first time, through which the radiant heat from the cylindrical water-cooled wall of a phosphorus burning tower is recovered; in "a furnace-process phosphoric acid waste-heat utilization device with a radiation-convective heat transfer surface (Application No. 2013103865140)", a method for reducing temperature at the outlet of a phosphorus burning tower is disclosed; in "an integrated lifting-type furnace-process phosphoric acid waste-heat utilization device (Application No. 201811226448.X)", a method for recovering heat from a lower head is disclosed; and in "a furnace-process phosphoric acid production device with low-temperature heat energy recovery (Application No. 201610036227.0)", a method for generating low-pressure steam by recovering heat from a hydration tower using polyphosphoric acid is disclosed. However, due to the fact that the heat energy recovery system of the phosphorus burning tower and the heat energy recover system of the hydration tower in each of above patents are independent of each other, the phosphorus burning tower can generate medium-high-pressure steam, while the hydration tower can only generate low-pressure steam of 0.4-0.8 MPa as the heat generated by the hydration tower is limited by the temperature of polyphosphoric acid, thus the steam cannot be conveyed to an external system for use, and the effective energy is low.

SUMMARY

A technical problem to be solved by the present disclosure is to provide a total heat energy recovery system for furnace-process phosphoric acid, which can improve heat energy recovery, and is energy-saving, environment-friendly, and low-cost.

To solve above technical problem, a technical solution adopted by the present disclosure is as follows: a total heat energy recovery system for furnace-process phosphoric acid comprises a phosphorus burning tower, the lower part of the phosphorus burning tower is provided with an air inlet through which yellow phosphorus and air enter the phosphorus burning tower; soft water enters the phosphorus burning tower from an upper head at the top of the phosphorus burning tower, one end of a gas guide tube is connected to the phosphorus burning tower, and the other end of the gas guide tube communicates with the top of a hydration tower; after being heated by the gas guide tube, the soft water passes through a pipeline and is mixed with part of steam to be conveyed into a deaerator, and a water outlet of the deaerator communicates with a soft water inlet of an economizer through a feedwater pump; a gas outlet of the hydration tower is connected to a gas inlet of an absorption tower, a polyphosphoric acid outlet of the hydration tower is connected to a polyphosphoric acid inlet of the economizer through a first phosphoric acid pump, a soft water outlet of the economizer communicates with a steam pocket of the phosphorus burning tower through a pipeline, a steam outlet of the steam pocket of the phosphorus burning tower communicates with a steam inlet of a steam manifold, and the steam is discharged from a steam outlet of the steam manifold; a polyphosphoric acid outlet of the economizer communicates with a polyphosphoric acid inlet of the hydration tower, a phosphoric acid outlet of the absorption tower respectively communicates with a phosphoric acid inlet of the hydration tower and a phosphoric acid inlet of the absorption tower through a second phosphoric acid pump, and a gas outlet of the absorption tower communicates with a gas inlet end of a Venturi tube; a gas outlet of the Venturi tube communicates with a gas inlet of a demister, and a gas outlet of the demister discharges end gas; a dilute phosphoric acid outlet of the Venturi tube communicates with a liquid inlet of a dilute acid circulating tank, and a liquid outlet of the dilute acid circulating tank communicates with a liquid inlet of the Venturi tube through a third phosphoric acid pump; the soft water enters the upper head of the phosphorus burning tower and the gas guide tube to be heated, then enters the deaerator, is pumped into the economizer by the feedwater pump to recover sensible heat of gas and heat of hydration of phosphorus pentoxide which are brought into the hydration tower by the phosphorus burning tower gas, and then enters the steam pocket of the phosphorus burning tower to serve as boiler feed water, thus generating steam with different pressure grades by recovering heat of reaction of yellow phosphorous of the phosphorus burning tower.

The further technical solution is as follows: the economizer comprises a cylinder body located in the middle, and a polyphosphoric acid inlet head and a polyphosphoric acid outlet head located at the two ends; the polyphosphoric acid inlet is located at the polyphosphoric acid inlet head, the polyphosphoric acid outlet is located at the polyphosphoric acid outlet head, the soft water outlet is located at the cylinder body close to the polyphosphoric acid inlet, and the soft water inlet is located at the cylinder body close to the polyphosphoric acid outlet; a polyphosphoric acid inlet thermocouple is arranged on the polyphosphoric acid inlet, a polyphosphoric acid outlet thermocouple is arranged on the polyphosphoric acid outlet, a soft water outlet thermocouple is arranged on the soft water outlet, and a soft water inlet thermocouple is arranged on the soft water inlet.

Preferably, the heads are installed to the cylinder body by flanges.

The further technical solution is as follows: baffle plates and heat exchange tubes are arranged in the cylinder body, the baffle plates are vertically arranged in a staggered mode, and the heat exchange tubes are arranged in an axial direction of the cylinder body.

Preferably, in the hydration tower, the polyphosphoric acid is used to absorb phosphorus pentoxide gas, the concentration of the polyphosphoric acid is controlled to be 105%-120% in terms of $H_3PO_4$, and the temperature of the polyphosphoric acid is 160-220° C.

The further technical solution is as follows: the economizer is a shell-and-tube heat exchanger and is made of nickel-chromium-molybdenum alloy steel or corrosion-resistant alloy steel.

The further technical solution is as follows: the heat of the polyphosphoric acid entering the economizer is absorbed by the soft water in the economizer to generate hot water matched with the pressure of byproduct steam, and after being cooled, most of the polyphosphoric acid is recycled, and a small portion of the polyphosphoric acid is output as product acid.

Preferably, the pressure of the byproduct steam is 1.5-3.9 MPa.

The beneficial effects generated by adopting above technical solutions are as follows: in consideration of the whole process system, the heat of reaction of yellow phosphorus and heat of hydration of the furnace-process phosphoric acid are fully recovered, the fresh soft water is heated to 102-104° C. by the upper head of the phosphorus burning tower and the gas guide tube to be deoxidized, the deoxidized soft water enters the economizer through a soft water high-pressure pump to recover the heat of the hydration tower, and then enters the phosphorus burning tower to recover the heat of reaction of yellow phosphorus to generate medium-high-pressure steam. Therefore, unified recovery of the heat of the furnace-process phosphoric acid device is achieved, the medium-high pressure steam is generated, the effective energy is improved, a circulating cooling tower of the furnace-process phosphoric acid device is omitted, and the production process is efficient, energy-saving, environment-friendly, and green.

The system provided by the present disclosure recovers both the heat of reaction of yellow phosphorus and the heat of hydration of phosphorus pentoxide; the temperature of cyclic absorption of phosphoric acid by the hydration tower is increased by increasing the acid concentration, thus the problem of high-temperature strong corrosion of the low-concentration phosphoric acid is solved. By constructing an integrated recovery process of the heat of hydration and the heat of reaction of yellow phosphorus, the key technical problems that the pressure of the byproduct steam generated in low-temperature heat energy recovery is low and the effective energy is low are solved.

BRIEF DESCRIPTION OF THE DRAWINGS

The following further describes the present disclosure in detail with reference to the accompanying drawings and specific embodiments.

Figure 1:
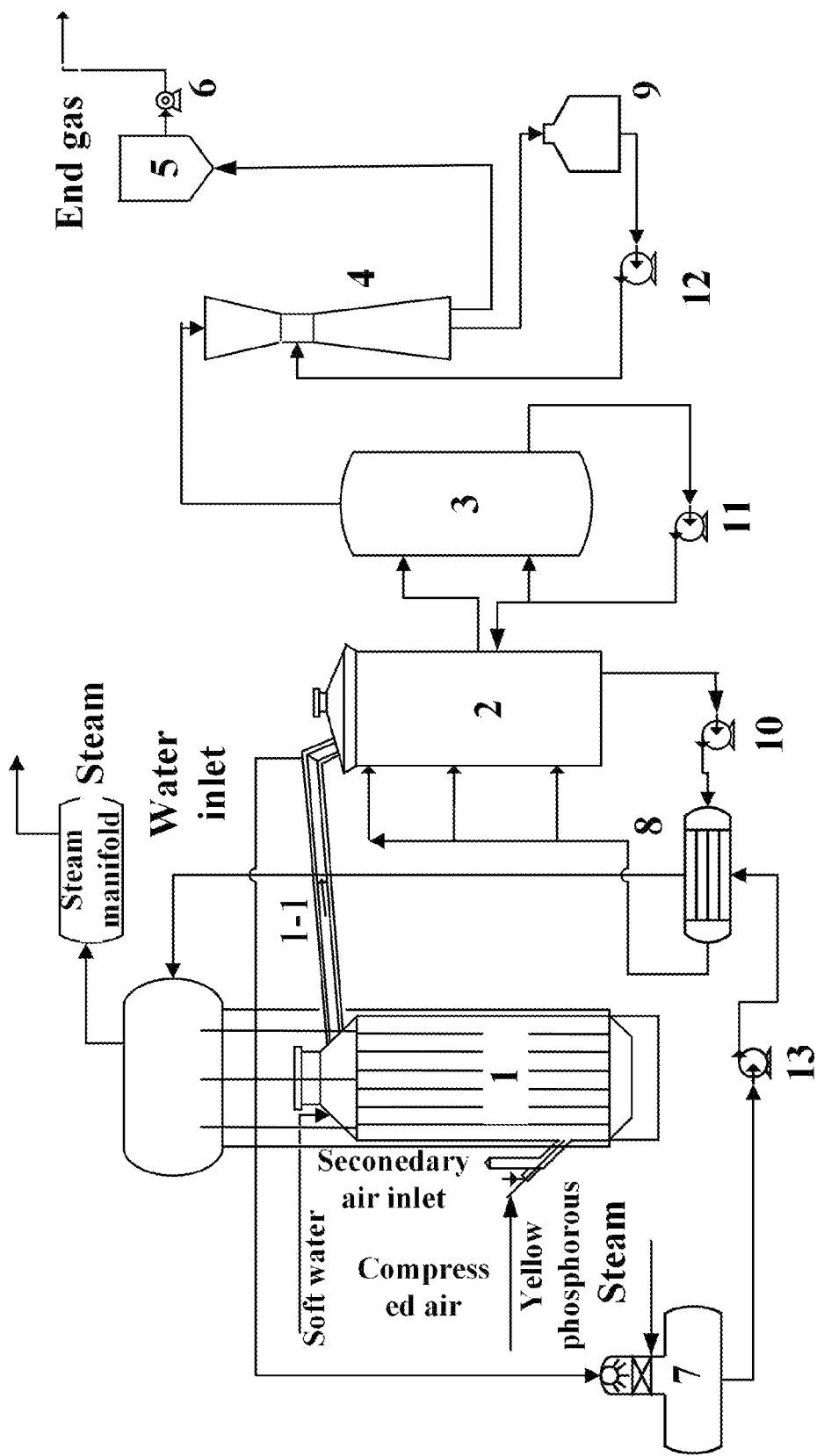
FIG. 1 is a functional block diagram of the system in accordance with an embodiment of the present disclosure.

In the drawings: 1—phosphorus burning tower; 2—hydration tower; 3—absorption tower; 4—Venturi tube; 5—demister; 6—induced draft fan; 7—deaerator; 8—economizer; 9—dilute acid circulating tank; 10—first phosphoric acid pump; 11—second phosphoric acid pump; 12—third phosphoric acid pump; 13—feedwater pump;

8-1—polyphosphoric acid inlet head; 8-2—polyphosphoric acid inlet thermocouple; 8-3—polyphosphoric acid inlet; 8-4—soft water outlet; 8-5—soft water outlet thermocouple; 8-6—baffle plate; 8-7—heat exchange tube; 8-8—cylinder body; 8-9—flange; 8-10—polyphosphoric acid outlet head; 8-11—polyphosphoric acid outlet thermocouple; 8-12—polyphosphoric acid outlet; 8-13—soft water inlet; 8-14—soft water inlet thermocouple.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Numerous specific details are set forth in the following description to provide a thorough understanding of the present disclosure, but the present disclosure may be implemented in other ways than those described herein, and those skilled in the art may make similar generalization without departing from the connotation of the present disclosure, and the present disclosure is therefore not to be limited by the specific embodiments disclosed below.

Embodiment 1

Overall, as shown in FIG. 1, a total heat energy recovery system for furnace-process phosphoric acid is disclosed by an embodiment of the present disclosure, comprising a phosphorus burning tower 1, the lower part of the phosphorus burning tower 1 is provided with an air inlet through which yellow phosphorus and air enter the phosphorus burning tower 1; soft water enters the phosphorus burning tower 1 from an upper head at the top of the phosphorus burning tower 1, one end of a gas guide tube 1-1 is connected to the phosphorus burning tower 1, and the other end of the gas guide tube 1-1 communicates with the top of a hydration tower 2; after being heated by the gas guide tube 1-1, the soft water passes through a pipeline and is mixed with part of steam to be conveyed into a deaerator 7, and a water outlet of the deaerator 7 communicates with a soft water inlet of an economizer 8 through a feedwater pump 13; a gas outlet of the hydration tower 2 is connected to a gas inlet of an absorption tower 3, a polyphosphoric acid outlet of the hydration tower 2 is connected to a polyphosphoric acid inlet of the economizer 8 through a first phosphoric acid pump 10, a soft water outlet of the economizer 8 communicates with a steam pocket of the phosphorus burning tower through a pipeline, a steam outlet of the steam pocket of the phosphorus burning tower communicates with a steam inlet of a steam manifold, and the steam is discharged from a steam outlet of the steam manifold.

Figure 3:
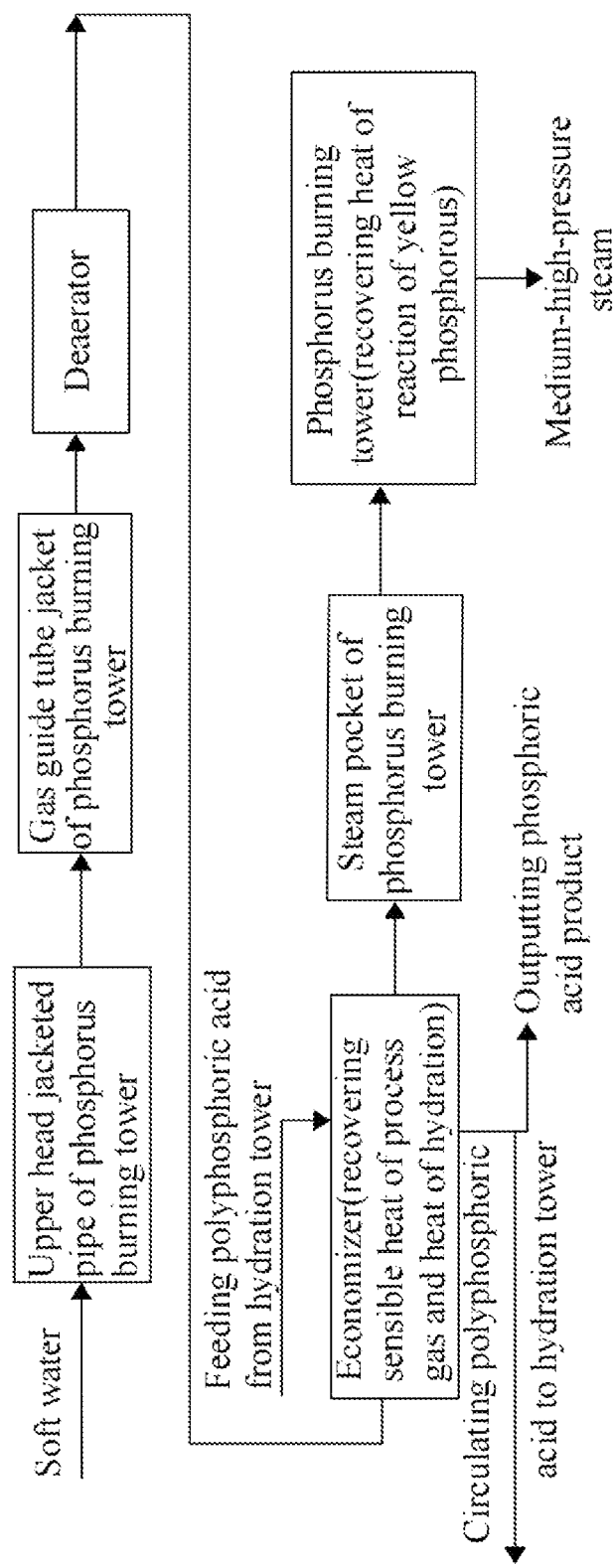
FIG. 3 is a flow diagram of a heat energy recovery process of the system in accordance with an embodiment of the present disclosure.

A polyphosphoric acid outlet of the economizer 8 communicates with a polyphosphoric acid inlet of the hydration tower; a phosphoric acid outlet of the absorption tower 3 respectively communicates with a phosphoric acid inlet of the hydration tower 2 and a phosphoric acid inlet of the absorption tower 3 through a second phosphoric acid pump 11, and a gas outlet of the absorption tower 3 communicates with a gas inlet end of a Venturi tube 4; a gas outlet of the Venturi tube 4 communicates with a gas inlet of a demister 5, and a gas outlet of the demister 5 discharges end gas by an induced draft fan 6; a dilute phosphoric acid outlet of the Venturi tube 4 communicates with a liquid inlet of a dilute acid circulating tank 9, and a liquid outlet of the dilute acid circulating tank 9 communicates with a liquid inlet of the Venturi tube 4 through a third phosphoric acid pump 12; the soft water enters the upper head of the phosphorus burning tower 1 and the gas guide tube 1-1 to be heated, then enters the deaerator 7, is pumped into the economizer 8 by the feedwater pump 13 to recover sensible heat of gas and heat of hydration of phosphorus pentoxide which are brought into the hydration tower by the phosphorus burning tower gas, and then enters the steam pocket of the phosphorus burning tower 1 to serve as boiler feed water, thus generating steam with different pressure grades by recovering heat of reaction of yellow phosphorous of the phosphorus burning tower 1. The flow of the heat energy recovery process of the system provided by the present disclosure is as shown in FIG. 3.

Figure 2:
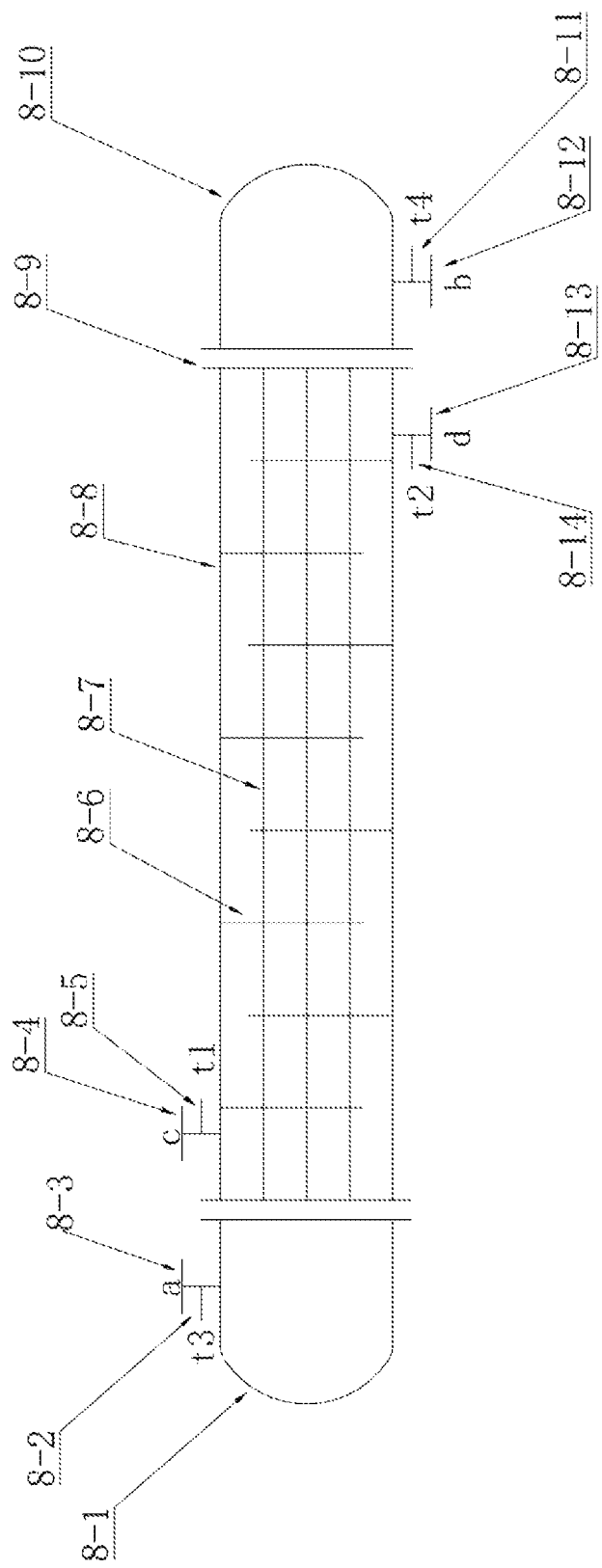
FIG. 2 is a structure diagram of an economizer in the system in accordance with an embodiment of the present disclosure.

Further, as shown in FIG. 2, the economizer comprises a cylinder body 8-8 located in the middle, and a polyphosphoric acid inlet head 8-1 and a polyphosphoric acid outlet head 8-10 located at the two ends; the polyphosphoric acid inlet 8-3 is located at the polyphosphoric acid inlet head 8-1, the polyphosphoric acid outlet 8-12 is located at the polyphosphoric acid outlet head 8-10, the soft water outlet 8-4 is located at the cylinder body 8-8 close to the polyphosphoric acid inlet 8-3, and the soft water inlet 8-13 is located at the cylinder body 8-8 close to the polyphosphoric acid outlet 8-12; a polyphosphoric acid inlet thermocouple 8-2 is arranged on the polyphosphoric acid inlet 8-3, a polyphosphoric acid outlet thermocouple 8-11 is arranged on the polyphosphoric acid outlet 8-12, a soft water outlet thermocouple 8-5 is arranged on the soft water outlet 8-4, and a soft water inlet thermocouple 8-14 is arranged on the soft water inlet 8-13.

Further, the heads are installed to the cylinder body 8-8 by flanges 8-9, certainly, the heads can be connected to the cylinder body in other ways. Baffle plates 8-6 and heat exchange tubes 8-7 are arranged in the cylinder body 8-8, the baffle plates 8-6 are vertically arranged in a staggered mode, and the heat exchange tubes 8-7 are arranged in an axial direction of the cylinder body 8-8. In the hydration tower 2, the polyphosphoric acid is used to absorb phosphorus pentoxide gas, the concentration of the polyphosphoric acid is controlled to be 105%-120% in terms of $H_3PO_4$, and the temperature of the polyphosphoric acid is 160-220° C. Preferably, the economizer 8 is a shell-and-tube heat exchanger and is made of nickel-chromium-molybdenum alloy steel or corrosion-resistant alloy steel. The heat of the polyphosphoric acid entering the economizer 8 is absorbed by the soft water in the economizer 8 to generate hot water matched with the pressure of byproduct steam, and after being cooled, most of the polyphosphoric acid is recycled, and a small portion of the polyphosphoric acid is output as product acid. Preferably, the pressure of the byproduct steam is 1.5-3.9 MPa.

Embodiment 2

The system employs 2,000 kg/h yellow phosphorus to produce furnace-process phosphoric acid, the soft water firstly enters the upper head of the phosphorus burning tower 1 and the gas guide tube 1-1 to be heated, then enters the deaerator 7, then is pumped into the economizer 8 by the feedwater pump 13 to recover the sensible heat of gas and the heat of hydration of phosphorus pentoxide which are brought into the hydration tower by phosphorus burning tower gas, then enters the steam pocket of the phosphorus burning tower 1 to serve as boiler feed water, thus generating 16.2 t/h of 1.5 MPa medium-pressure steam by recovering the heat of reaction of yellow phosphorus and heat of hydration of the furnace-process phosphoric acid. Wherein the hydration tower 2 is a spray absorption tower.

During use, the yellow phosphorus is burned with the natural air in the phosphorus burning tower 1 for furnace-process phosphoric acid, phosphorus pentoxide generated by the combustion of the yellow phosphorus enters the hydration tower 2, polyphosphoric acid with the mass percent concentration of 105% (in terms of $H_3PO_4$) is atomized by a nozzle, and the polyphosphoric acid is sprayed from top to bottom to make the phosphorus pentoxide gas in full contact with the polyphosphoric acid to form polyphosphoric acid with the mass percent concentration of 110% (in terms of $H_3PO_4$) at 160° C.; the polyphosphoric acid enters the economizer 8 to exchange heat with water, the temperature at the polyphosphoric acid outlet is 140° C., most of the polyphosphoric acid subjected to heat exchange by the economizer is mixed with low-concentration phosphoric acid from a secondary phosphoric acid pump and then enters the hydration tower again to be recycled, and a small portion of the polyphosphoric acid is output as a product. After the absorption of the hydration tower, the phosphoric acid-containing acid mist and liquid foam are secondarily absorbed by the absorption tower 3, and then are directly discharged into the atmosphere by the fan after being treated by the Venturi tube 4 and the demister 5. In accordance with this embodiment, the polyphosphoric acid with the mass percent concentration of 110% is produced.

Embodiment 3

The system employs 2,400 kg/h yellow phosphorus to produce furnace-process phosphoric acid, the soft water firstly enters the upper head of the phosphorus burning tower 1 and the gas guide tube 1-1 to be heated, then enters the deaerator 7, then is pumped into the economizer 8 by the feedwater pump 13 to recover the sensible heat of gas and the heat of hydration of phosphorus pentoxide which are brought into the hydration tower by phosphorus burning tower gas, then enters the steam pocket of the phosphorus burning tower 1 to serve as boiler feed water, thus generating 21.6 t/h of 2.5 MPa medium-pressure steam by recovering the heat of reaction of yellow phosphorus and heat of hydration of the furnace-process phosphoric acid. Wherein the hydration tower 2 is a spray absorption tower with a spiral guide tube with process intensification.

During use, the yellow phosphorus is burned with the natural air in the phosphorus burning tower 1 for furnace-process phosphoric acid, phosphorus pentoxide generated by the combustion of the yellow phosphorus enters the hydration tower 2, polyphosphoric acid with the mass percent concentration of 112% (in terms of $H_3PO_4$) is atomized by a nozzle, and the polyphosphoric acid is sprayed from top to bottom to make the phosphorus pentoxide gas in full contact with the polyphosphoric acid to form polyphosphoric acid with the mass percent concentration of 115% (in terms of $H_3PO_4$) at 200° C.; the polyphosphoric acid enters the economizer 8 to exchange heat with water, the temperature at the polyphosphoric acid outlet is 180° C., most of the polyphosphoric acid subjected to heat exchange by the economizer is mixed with low-concentration phosphoric acid from a secondary phosphoric acid pump and then enters the hydration tower again to be recycled, and a small portion of the polyphosphoric acid is output as a product. After the absorption of the hydration tower, the phosphoric acid-containing acid mist and liquid foam are secondarily absorbed by the absorption tower 3, and then are directly discharged into the atmosphere by the fan after being treated by the Venturi tube 4 and the demister 5. In accordance with this embodiment, the polyphosphoric acid with the mass percent concentration of 115% is produced.

Embodiment 4

The system employs 3,000 kg/h yellow phosphorus to produce furnace-process phosphoric acid, the soft water firstly enters the upper head of the phosphorus burning tower 1 and the gas guide tube 1-1 to be heated, then enters the deaerator 7, then is pumped into the economizer 8 by the feedwater pump 13 to recover the sensible heat of gas and the heat of hydration of phosphorus pentoxide which are brought into the hydration tower by phosphorus burning tower gas, then enters the steam pocket of the phosphorus burning tower 1 to serve as boiler feed water, thus generating 25.5 t/h of 3.9 MPa medium-pressure steam by recovering the heat of reaction of yellow phosphorus and heat of hydration of the furnace-process phosphoric acid. Wherein the hydration tower 2 is a spray absorption tower with a spiral guide tube with process intensification.

During use, the yellow phosphorus is burned with the natural air in the phosphorus burning tower 1 for furnace-process phosphoric acid, phosphorus pentoxide generated by the combustion of the yellow phosphorus enters the hydration tower 2, polyphosphoric acid with the mass percent concentration of 116% (in terms of $H_3PO_4$) is atomized by a nozzle, and the polyphosphoric acid is sprayed from top to bottom to make the phosphorus pentoxide gas in full contact with the polyphosphoric acid to form polyphosphoric acid with the mass percent concentration of 120% (in terms of $H_3PO_4$) at 220° C.; the polyphosphoric acid enters the economizer 8 to exchange heat with water, the temperature at the polyphosphoric acid outlet is 200° C., most of the polyphosphoric acid subjected to heat exchange by the economizer is mixed with low-concentration phosphoric acid from a secondary phosphoric acid pump and then enters the hydration tower again to be recycled, and a small portion of the polyphosphoric acid is output as a product. After the absorption of the hydration tower, the phosphoric acid-containing acid mist and liquid foam are secondarily absorbed by the absorption tower 3, and then are directly discharged into the atmosphere by the fan after being treated by the Venturi tube 4 and the demister 5. In accordance with this embodiment, the polyphosphoric acid with the mass percent concentration of 120% is produced.

In the hydration tower 2, the polyphosphoric acid is used to absorb the phosphorus pentoxide gas, the concentration of the polyphosphoric acid is controlled at 105%-120% (in terms of $H_3PO_4$), and the temperature of the polyphosphoric acid is 160-220° C.; the coal economizer 8 is a shell-and-tube heat exchanger and is made of nickel-chromium-molybdenum alloy steel or corrosion-resistant alloy steel.

In consideration of the whole process system, the heat of reaction of yellow phosphorus and heat of hydration of the furnace-process phosphoric acid are fully recovered, the fresh soft water is heated to 102-104° C. by the upper head of the phosphorus burning tower and the gas guide tube to be deoxidized, the deoxidized soft water enters the economizer through a soft water high-pressure pump to recover the heat of the hydration tower, and then enters the phosphorus burning tower to recover the heat of reaction of the yellow phosphorus to generate medium-high-pressure steam. Therefore, unified recovery of the heat of the furnace-process phosphoric acid device is achieved, the medium-high pressure steam is generated, the effective energy is improved, a circulating cooling tower of the furnace-process phosphoric acid device is omitted, and the production process is efficient, energy-saving, environment-friendly and green.

What is claimed is:

1. A total heat energy recovery system for furnace-process phosphoric acid, comprising a phosphorus burning tower (1), the lower part of the phosphorus burning tower (1) is provided with an air inlet through which yellow phosphorus and air enter the phosphorus burning tower (1); soft water enters the phosphorus burning tower (1) from an upper head at the top of the phosphorus burning tower (1), one end of a gas guide tube (1-1) is connected to the phosphorus burning tower (1), and the other end of the gas guide tube (1-1) communicates with the top of a hydration tower (2); after being heated by the gas guide tube (1-1), the soft water passes through a pipeline and is mixed with part of steam to be conveyed into a deaerator (7), and a water outlet of the deaerator (7) communicates with a soft water inlet of an economizer (8) through a feedwater pump (13); a gas outlet of the hydration tower (2) is connected to a gas inlet of an absorption tower (3), a polyphosphoric acid outlet of the hydration tower (2) is connected to a polyphosphoric acid inlet of the economizer (8) through a first phosphoric acid pump (10), a soft water outlet of the economizer (8) communicates with a steam pocket of the phosphorus burning tower through a pipeline, a steam outlet of the steam pocket of the phosphorus burning tower communicates with a steam inlet of a steam manifold, and the steam is discharged from a steam outlet of the steam manifold; a polyphosphoric acid outlet of the economizer (8) communicates with a polyphosphoric acid inlet of the hydration tower; a phosphoric acid outlet of the absorption tower (3) respectively communicates with a phosphoric acid inlet of the hydration tower (2) and a phosphoric acid inlet of the absorption tower (3) through a second phosphoric acid pump (11), and a gas outlet of the absorption tower (3) communicates with a gas inlet end of a Venturi tube (4); a gas outlet of the Venturi tube (4) communicates with a gas inlet of a demister (5), and a gas outlet of the demister (5) discharges end gas through an induced draft fan (6); a dilute phosphoric acid outlet of the Venturi tube (4) communicates with a liquid inlet of a dilute acid circulating tank (9), and a liquid outlet of the dilute acid circulating tank (9) communicates with a liquid inlet of the Venturi tube (4) through a third phosphoric acid pump (12); the soft water enters the upper head of the phosphorus burning tower (1) and the gas guide tube (1-1) to be heated, then enters the deaerator (7), is pumped into the economizer (8) by the feedwater pump (13) to recover sensible heat of gas and heat of hydration of phosphorus pentoxide which are brought into the hydration tower by the phosphorus burning tower gas, and then enters the steam pocket of the phosphorus burning tower (1) to serve as boiler feed water, thus generating steam with different pressure grades by recovering heat of reaction of yellow phosphorous of the phosphorus burning tower (1).

2. The total heat energy recovery system for furnace-process phosphoric acid according to claim 1, wherein the economizer comprises a cylinder body (8-8) located in the middle, and a polyphosphoric acid inlet head (8-1) and a polyphosphoric acid outlet head (8-10) located at the two ends; the polyphosphoric acid inlet (8-3) is located at the polyphosphoric acid inlet head (8-1), the polyphosphoric acid outlet (8-12) is located at the polyphosphoric acid outlet head (8-10), the soft water outlet (8-4) is located at the cylinder body (8-8) close to the polyphosphoric acid inlet (8-3), and the soft water inlet (8-13) is located at the cylinder body (8-8) close to the polyphosphoric acid outlet (8-12); a polyphosphoric acid inlet thermocouple (8-2) is arranged on the polyphosphoric acid inlet (8-3), a polyphosphoric acid outlet thermocouple (8-11) is arranged on the polyphosphoric acid outlet (8-12), a soft water outlet thermocouple (8-5) is arranged on the soft water outlet (8-4), and a soft water inlet thermocouple (8-14) is arranged on the soft water inlet (8-13).

3. The total heat energy recovery system for furnace-process phosphoric acid according to claim 2, wherein the heads are installed to the cylinder body (8-8) by flanges (8-9).

4. The total heat energy recovery system for furnace-process phosphoric acid according to claim 2, wherein baffle plates (8-6) and heat exchange tubes (8-7) are arranged in the cylinder body (8-8), the baffle plates (8-6) are vertically arranged in a staggered mode, and the heat exchange tubes (8-7) are arranged in an axial direction of the cylinder body (8-8).

5. The total heat energy recovery system for furnace-process phosphoric acid according to claim 1, wherein in the hydration tower (2), the polyphosphoric acid is used to absorb phosphorus pentoxide gas, the concentration of the polyphosphoric acid is controlled to be 105%-120% in terms of $H_3PO_4$, and the temperature of the polyphosphoric acid is 160-220° C.

6. The total heat energy recovery system for furnace-process phosphoric acid according to claim 1, wherein the economizer (8) is a shell-and-tube heat exchanger and is made of nickel-chromium-molybdenum alloy steel or corrosion-resistant alloy steel.

7. The total heat energy recovery system for furnace-process phosphoric acid according to claim 1, wherein the heat of the polyphosphoric acid entering the economizer (8) is absorbed by the soft water in the economizer (8).

* * * * *